United States Patent
Tanaka et al.

(10) Patent No.: US 9,614,415 B2
(45) Date of Patent: Apr. 4, 2017

(54) ROTARY ELECTRIC MACHINE WITH A HEAT SINK THAT HAS A PLURALITY OF FINS ARRANGED IN GROUPS

(75) Inventors: Kazunori Tanaka, Tokyo (JP); Toshiyuki Oonishi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 14/371,039

(22) PCT Filed: Mar. 9, 2012

(86) PCT No.: PCT/JP2012/056141
§ 371 (c)(1),
(2), (4) Date: Jul. 8, 2014

(87) PCT Pub. No.: WO2013/132653
PCT Pub. Date: Sep. 12, 2013

(65) Prior Publication Data
US 2014/0339931 A1    Nov. 20, 2014

(51) Int. Cl.
| | | |
|---|---|---|
| *H02K 5/18* | (2006.01) | |
| *H02K 11/04* | (2016.01) | |
| *H02K 11/00* | (2016.01) | |
| *F28F 7/00* | (2006.01) | |
| *H02K 9/00* | (2006.01) | |

(52) U.S. Cl.
CPC ............. *H02K 9/00* (2013.01); *H02K 11/046* (2013.01); *H02K 5/18* (2013.01); *H02K 2209/00* (2013.01)

(58) Field of Classification Search
CPC ............. H02K 9/00; H02K 5/18; H02K 19/20
USPC ..... 310/58, 61, 64, 68 B, 68 D, 71; 165/80.3
See application file for complete search history.

(56) References Cited

U.S. PATENT DOCUMENTS

| | | | |
|---|---|---|---|
| 5,455,382 A | | 10/1995 | Kojima et al. |
| 6,341,644 B1 | * | 1/2002 | Lo ................... H01L 23/4093 165/80.3 |
| 2002/0053841 A1 | * | 5/2002 | Asao ....................... 310/68 B |
| 2006/0175906 A1 | | 8/2006 | Hino et al. |
| 2009/0033181 A1 | | 2/2009 | Hamada |

FOREIGN PATENT DOCUMENTS

| | | | |
|---|---|---|---|
| JP | 06-169547 A | | 6/1994 |
| JP | 06224335 A | * | 8/1994 |
| JP | 3527516 B2 | | 5/2004 |

(Continued)

OTHER PUBLICATIONS

International Search Report, PCT/JP2012/056141, filed Apr. 10, 2012.

(Continued)

*Primary Examiner* — Jose Gonzalez Quinones
(74) *Attorney, Agent, or Firm* — Sughrue Mion, PLLC; Richard C. Turner (57) ABSTRACT

In order to prevent poor operability caused by entanglement of the fins in the heat sink during assembly without a drop in the cooling efficiency of the cooling flow along a rotation shaft, a plurality of fins 23c of the heat sink in a vehicle AC generator 1 is constituted by fin groups 123 in which fins are aligned in parallel in one direction, and an entanglement preventing portion 23d is disposed only on the respective outer side surfaces of a pair of outermost fins.

10 Claims, 7 Drawing Sheets

(56) References Cited

FOREIGN PATENT DOCUMENTS

| JP | 2006-180597 A | | 7/2006 |
|---|---|---|---|
| JP | 2009060711 A | * | 3/2009 |
| JP | 2012-29521 A | | 2/2012 |
| WO | 00/002429 A1 | | 1/2000 |
| WO | 2011/070280 A1 | | 6/2011 |

OTHER PUBLICATIONS

Communication dated Dec. 1, 2015, from the European Patent Office in counterpart European Application No. 12870773.4.

* cited by examiner

ROTARY ELECTRIC MACHINE WITH A HEAT SINK THAT HAS A PLURALITY OF FINS ARRANGED IN GROUPS

This application is a National Stage of International Application No. PCT/JP2012/056141 filed Mar. 9, 2012, the contents of all of which are incorporated herein by reference in their entirety.

TECHNICAL FIELD

The present invention relates to a rotary electric machine.

BACKGROUND ART

As an example of a rectifying device of a conventional vehicle AC generator, a horseshoe-shaped heat sink for cooling a rectifying element is disclosed in Patent Document 1. In the heat sink, a plurality of fins, each of which extend radially, is disposed. In the heat sink, damage to the fins caused by fins entangling with each other is prevented by forming a part of the fins to be thick in the outer peripheral end side.

Patent Document 2 discloses a type of press-fitting and the fixing of a rectifying element in a cooling heat sink, where a plurality of fins of the heat sink extends in a direction perpendicular to the press-fitting direction of the element, and these fins extend in parallel with each other (see FIG. 7 in Patent Document 2).

Patent Document 1: Japanese Patent No. 3527516
Patent Document 2: WO 2011/070280

Of conventional heat sinks, the configuration disclosed in Patent Document 1 is reviewed first. In a configuration of a heat sink of which the pitch is relatively narrow and the length in the radial direction and the length in the axis direction are both long, in order to improve the cooling efficiency, a mold may be opened in the radiation direction in the fin molding area, since a taper, which is always generated in a molded product, cannot be ignored (first pattern). In this case, a storage efficiency in the space in the substantially cylindrical generator improves, but this configuration makes the mold complicated and takes more manufacturing space than other types, which means that productivity is not improved.

The mold may be opened in the axis direction (second pattern). In this case, the mold moving space efficiency is improved but a flow passage for axial flow generated by the rotor fan becomes narrow (narrows down in the direction toward a base, which is an element support unit), that is, the cooling efficiency may deteriorate.

If a thick portion is created on the outer peripheral end side of the fins to prevent entanglement, as described in FIG. 10 of Patent Document 1, normally the mold must be opened in the axis direction, hence it is unavoidable that the tapers in the fins deteriorate the cooling efficiency. Thus the configuration disclosed in Patent Document 1 has merits and demerits in terms of the selection of manufacturing processes.

The configuration in Patent Document 2, on the other hand, discloses that the heat sink base main unit is a flat plate, and a plurality of fins extends in parallel with one another, but the fins can still become entangled with each other, even if the entanglement is less frequent than the fins which are disposed radially and of which intervals expand toward the outer periphery, as disclosed in Patent Document 1. If the thickness of the end portions of the fins is partially increased in the configuration of Patent Document 2, however, the mold must be opened during manufacturing in the axis direction, and as a result, the cooling flow for radiation in the axis direction becomes narrow, or the fin pitch must be decreased to prevent this narrowing, which means that productivity cannot be improved.

DISCLOSURE OF THE INVENTION

With the foregoing in view, it is an object of the present invention to provide a rotary electric machine, including a rectifying device that can prevent poor operability caused by entanglements of the fins in the heat sink during assembly, without dropping the cooling efficiency of the cooling flow along the rotation shaft.

To achieve the object, a rotary electric machine of the present invention has: a rotor that is rotatably supported in a casing; a stator that includes a stator winding and is supported in the casing; a rectifying device that is disposed on one end side in the axis direction outside the casing and rectifies an alternate current generated in the stator winding; and a voltage regulator that is disposed on one end side in the axis direction outside the casing and regulates a level of AC voltage generated in the stator, wherein the rectifying device includes a heat sink that supports a rectifying element and has a plurality of fins to cool the rectifying element, the plurality of fins are constituted by fin groups in which fins are aligned in parallel in one direction, and in each of the fin groups, entanglement preventing portions are disposed only on the respective outer side surfaces of a pair of outermost fins among outer side surfaces of the plurality of fins.

According to the present invention, poor operability caused by entanglements of the fins in the heat sink during assembly can be prevented without dropping the cooling efficiency of the cooling flow along the rotation shaft.

BEST MODE FOR CARRYING OUT THE INVENTION

An embodiment of a rotary electric machine according to the present invention, which is applied to a vehicle AC generator, will now be described with reference to the accompanying drawings. In the drawings, a same or a corresponding portion is denoted with a same reference symbol.

Figure 1:
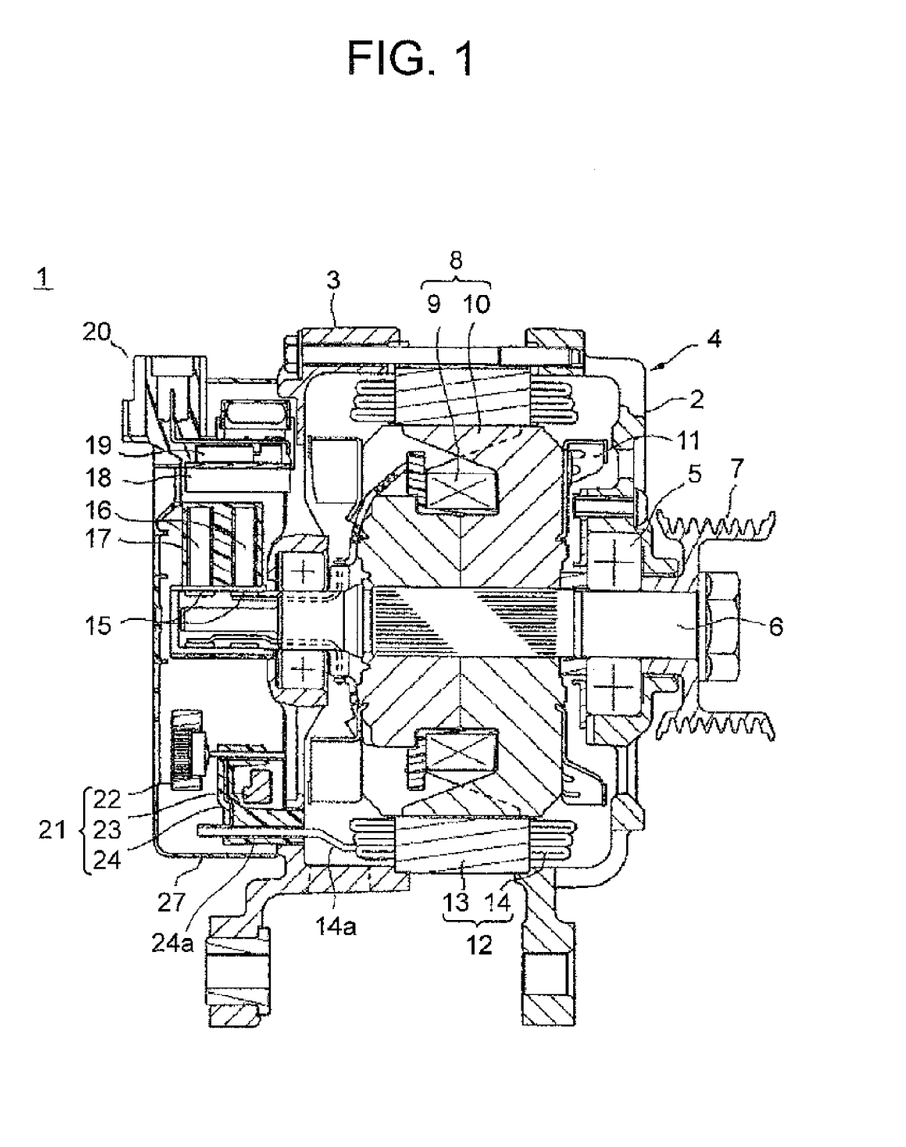
FIG. 1 is a cross-sectional side view depicting a vehicle AC generator according to an embodiment of the present invention.
Figure 2:
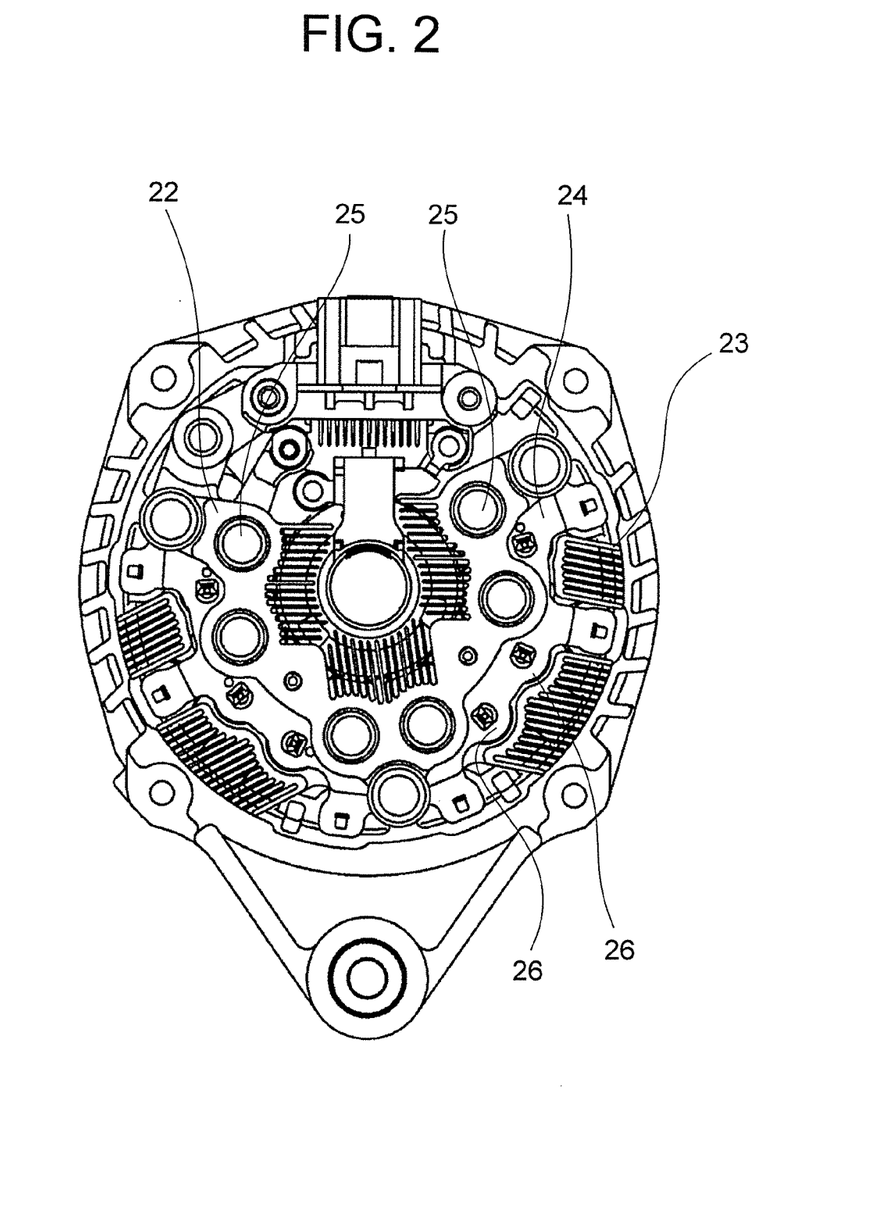
FIG. 2 is a rear view depicting an installation state of a rectifying device in the vehicle AC generator according to the embodiment, where a cover is not attached.

FIG. 1 is a cross-sectional side view depicting the vehicle AC generator according to the embodiment of the present invention, and FIG. 2 is a rear view depicting an installation state of a rectifying device in the vehicle AC generator according to Embodiment 1, where a cover is not attached.

As illustrated in FIG. 1 and FIG. 2, a casing 4 of the vehicle AC generator 1 includes a front bracket 2 and a rear bracket 3, which are substantially bowl-shaped and are made of aluminum. In the casing 4, a shaft 6 is rotatably supported via a pair of bearings 5.

A pulley 7 is fixed to the end of the shaft 6 which extends to the front side of the casing 4. A rotor 8 is disposed inside the casing 4, and the rotor 8 is fixed to the shaft 6. A fan 11 is fixed to both end faces of the rotor 8 in the axis direction. A stator 12 is fixed to the casing 4 so as to surround the rotor 8.

On the rear side of the vehicle AC generator 1, a pair of slip rings 15, a pair of brushes 16, a brush holder 17, a voltage regulator 19, a connector 20, a rectifying device 21 and a protection cover 27 are disposed.

The pair of slip rings 15 is fixed to the extended portion of the shaft 6, which extends to the rear side of the casing 4, and supplies an electric current to the rotor 8. The pair of brushes 16 is slidably disposed on the surface of the pair of slip rings 15 respectively. The brush holder 17 houses these brushes 16.

The voltage regulator 19 is installed in a heat sink 18 which is disposed on the outer diameter side of the brush holder 17, and regulates the level of the AC voltage generated in the stator 12. The connector 20 is integrally molded with a mounting portion of the heat sink 18, so that the voltage regulator 19 and an external device (not illustrated) inputs/outputs signals to each other.

The rectifying device 21 is disposed on the rear side of the rear bracket 3, and rectifies the AC voltage generated in the stator 12 into DC voltage. The protection cover 27 is attached to the rear brackets 3 so as to cover the brush holder 17, the voltage regulator 19 and the rectifying device 21.

The rotor 8 is a Lundell type rotor, and includes a field winding 9 which generates magnetic flux when excitation current is supplied, and a pole core 10 which is disposed so as to cover the field winding 9, and forms a magnetic pole using the magnetic flux thereof.

The stator 12 includes a cylindrical stator core 13, and a stator winding 14 which is wound around the stator core 13, and in which as a result of the rotation of the rotor 8 alternate current is generated by the change of magnetic flux from the field winding 9. The stator 12 is disposed so as to surround the rotor 8 in a state where the stator core 13 is held by the opening edge of the front bracket 2 and that of the rear bracket 3 in the axis direction.

The rectifying device 21 includes a positive electrode side heat sink 22 where a plurality of positive electrode side rectifying elements 25 is mounted, a negative electrode side heat sink 23 where a plurality of negative electrode side rectifying elements 26 is mounted, and a circuit board 24.

Figure 3:
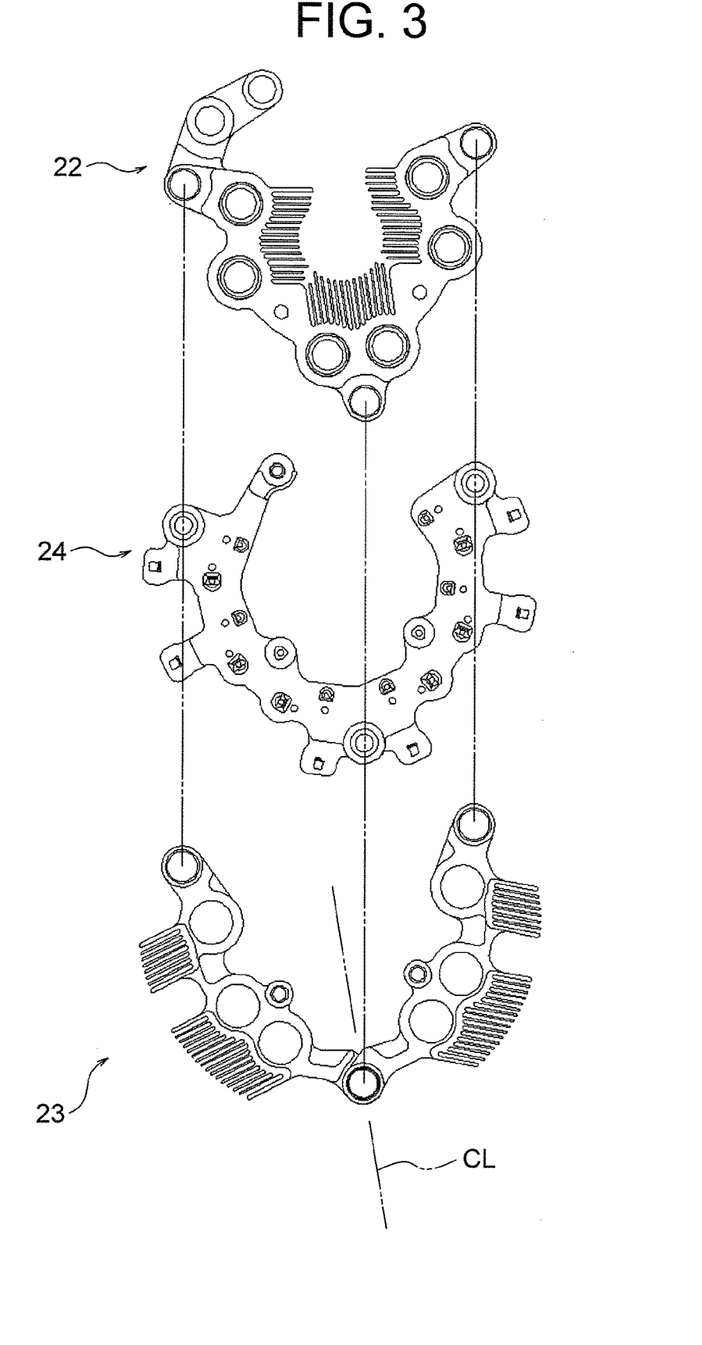
FIG. 3 is an exploded plan view of the rectifying device in FIG. 2.
Figure 4A:
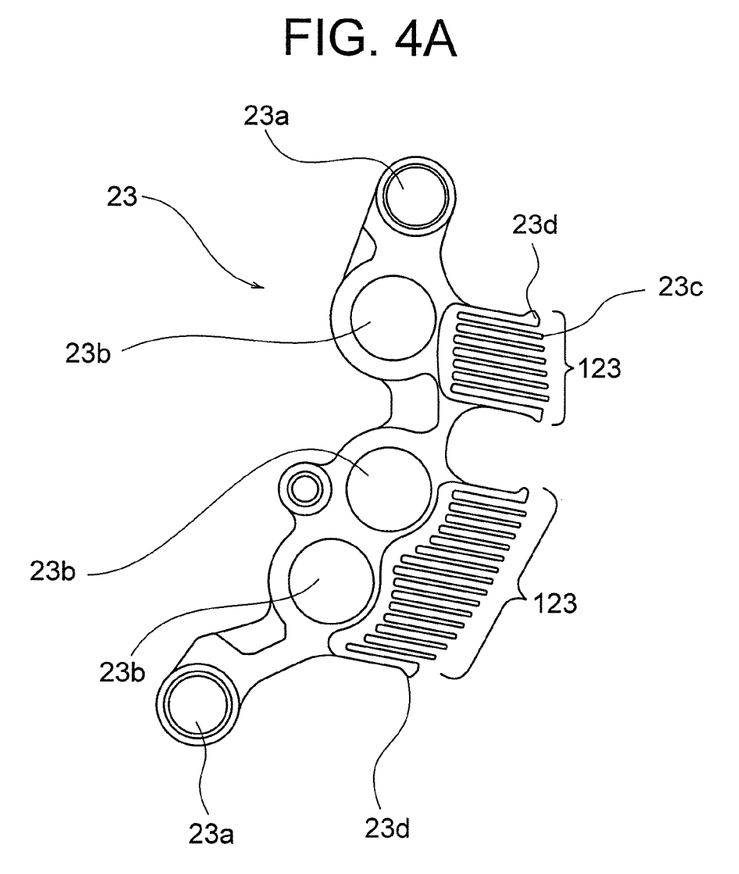
FIG. 4A is a plan view depicting a negative electrode side heat sink of the rectifying device in FIG. 2.
Figure 4B:
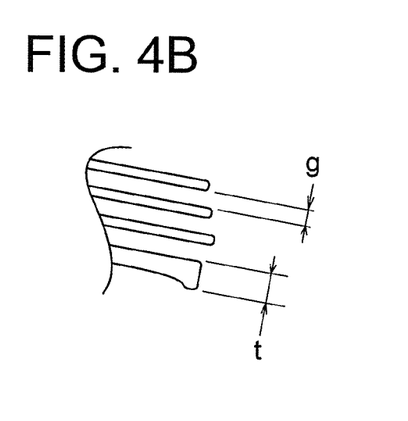
FIG. 4B is a partial enlarged view of fins.

The rectifying device 21 will be further described in detail with reference to FIG. 3 and FIG. 4. FIG. 3 is an exploded plan view of the rectifying device in FIG. 2. FIG. 4A is a plan view depicting a negative electrode side heat sink of the rectifying device in FIG. 2, and FIG. 4B is a partial enlarged view of fins.

The rectifying device 21 is constructed in a substantial C shape when viewed in the axis direction, where the circuit board 24 is held between the positive electrode side heat sink 22 and the negative electrode side heat sink 23. The positive electrode side rectifying elements 25 and the negative electrode side rectifying elements 26 are connected so as to constitute a predetermined bridge circuit via the circuit board 24.

The rectifying device 21 constructed like this is disposed on a plane orthogonal to the center of the shaft 6, at the outer peripheral side of the slip ring 15, and on this plane, the rectifying device 21 has a fan shape with the shaft 6 as the center. The rectifying device 21 is fixed in a state of being fastened to the outer end face of the rear bracket 3.

As illustrated in FIG. 1, a lead wire 14a of the stator winding 14 is led from the rear bracket 3 and is connected to a terminal 24a of the circuit board 24, whereby the rectifying device 21 and the stator winding 14 are electrically connected. The brush holder 17 is disposed between the tips of the substantial C shape of the rectifying device 21, and is fastened to the outer end face of the rear bracket 3.

Now a configuration of the negative electrode side heat sink 23 will be described with reference to FIG. 3 and FIG. 4. The negative electrode side heat sink 23 includes: a plurality of mounting holes 23a for securing the negative electrode side heat sink 23 to the rear bracket 3; a plurality of element support holes 23b for supporting the negative electrode side rectifying elements 26; and a plurality of fins 23c which extends in parallel with each other from the outer peripheral side of the element support holes 23b. The plurality of fins 23c forms a fin group 123 and is aligned in parallel in a direction (a direction that crosses with the Y direction or a direction that extends on the ZX plane) other than the axis direction (Y direction) in each fin group 123.

The fins 23c are formed relatively long in the plane direction and axis direction to implement high cooling efficiency. The fins 23c are manufactured by a known aluminum die casting, which injects molten metal of aluminum alloy into a mold at high-speed and high pressure, and casts a structure having a desired shape. In this generator, as illustrated in FIG. 3, a pair of negative electrode side heat sinks 23 is disposed in a state of aligning the respective mounting holes 23a on one end, so as to be symmetric with respect to a vertical center line CL as the center, whereby a fan-shaped cooling body is formed.

An entanglement preventing portion 23d is disposed only on the respective outer side surfaces of a pair of outermost fins 23c, out of a fin group 123, which is a group of fins 23c extending in parallel. Each of the entanglement preventing portions 23d is a thick portion, of which thickness increases toward the outside, in an area near the tip of the corresponding outermost fin 23c respectively. As illustrated in FIG. 4B, a "thickness t" of a tip of a fin where the entanglement preventing portion 23d is disposed is greater than a "distance g" between adjacent fins. In each of the fin groups 123, both side faces of each fin 23c, other than the outer side surface of a pair of outermost fins 23c, have a flat surface without the thick portion.

Figure 5:
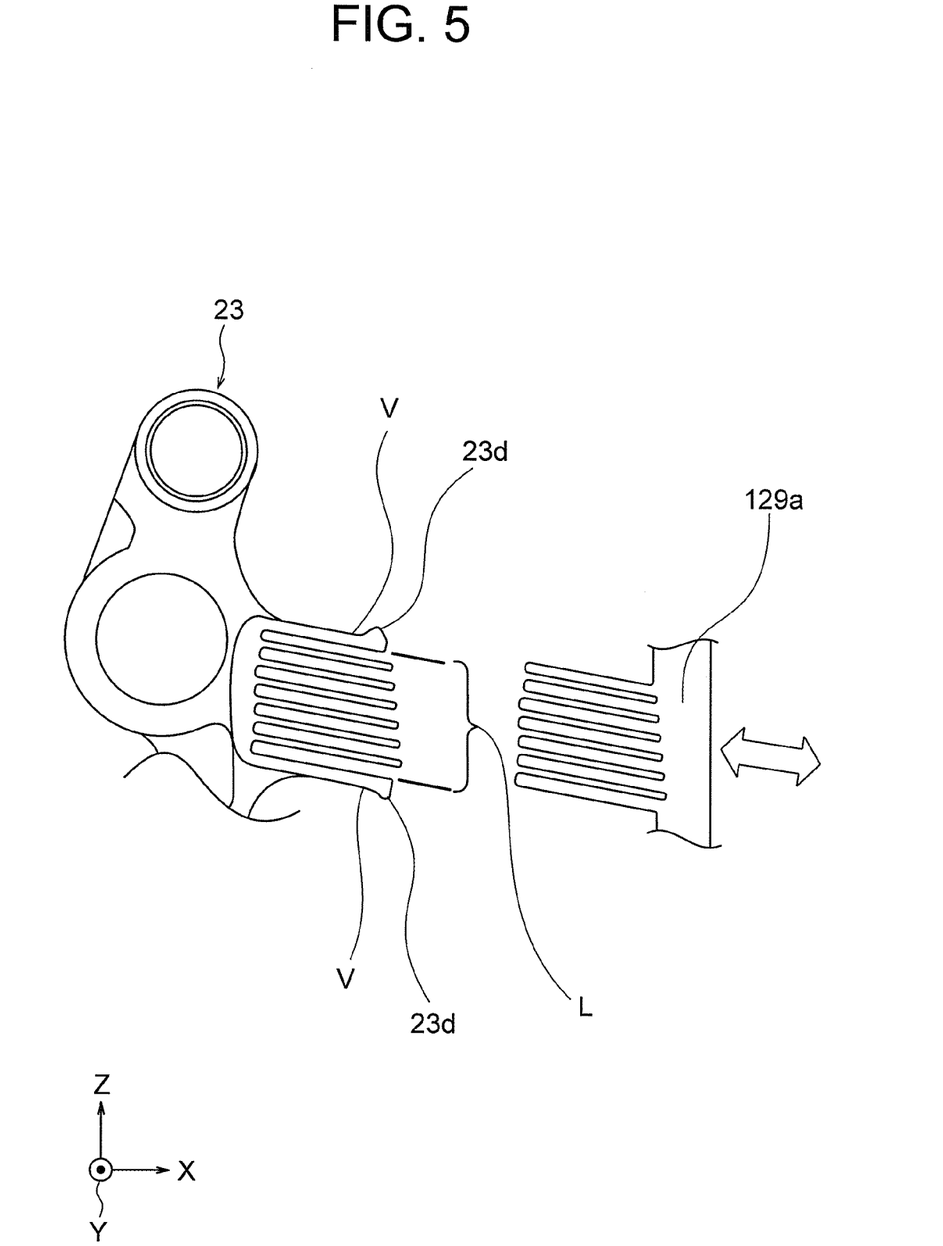
FIG. 5 is a partial enlarged view depicting a general configuration of a mold around the fins of the negative electrode side heat sink.
Figure 6A:
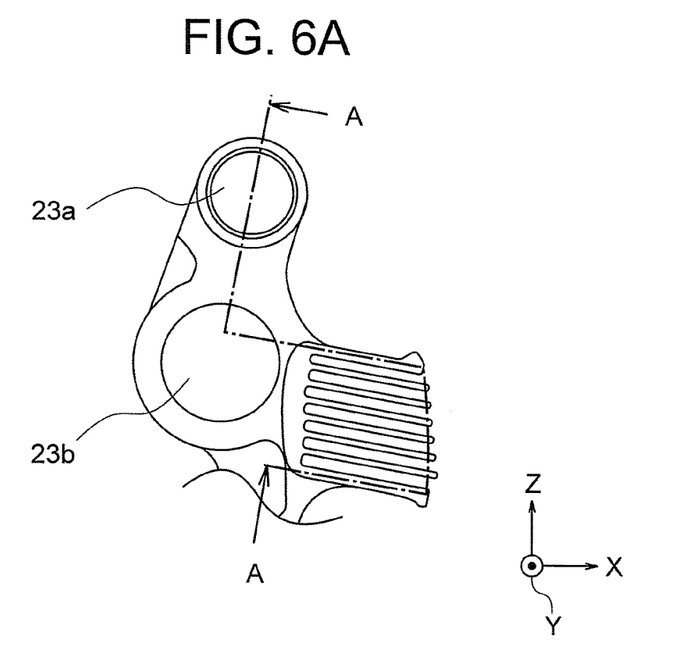
FIG. 6A shows the area around the fins of the negative electrode side heat sink in FIG. 5 marked with the A-A line.
Figure 6B:
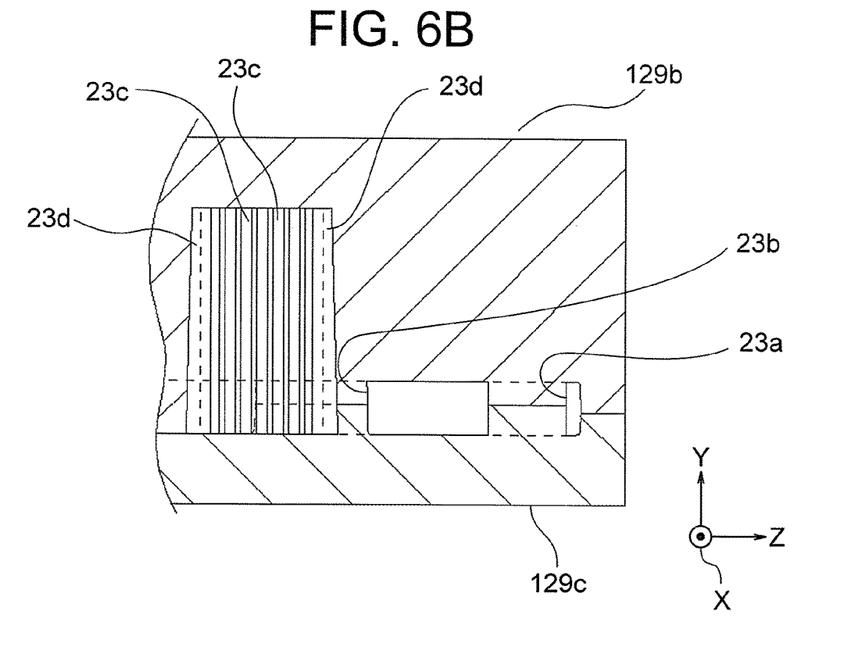
FIG. 6B is a partial cross-sectional view depicting a general configuration of a mold in the section of the A-A line.

FIG. 5 is a partial enlarged view depicting a general configuration of a mold around the fins of the negative electrode side heat sink. FIG. 6A shows the area around the fins of the negative electrode side heat sink in FIG. 5 marked with the A-A line, and FIG. 6B is a partial cross-sectional view depicting a general configuration of a mold in the section of the A-A line. As illustrated in FIG. 5, the entanglement preventing portion 23d is disposed only on the outermost side face, therefore an area L between the inner faces of the pair of fins 23c on the outermost sides of the fin group 123 is molded using a mold (e.g. 129a) which opens in the fin extending direction, that is a lateral direction (substantially the X direction, out of the three axes X, Y and Z which intersect orthogonally with each other). The respective outer surfaces V of the pair of fins 23c on the outermost sides, which are the outer surfaces V including the entanglement preventing portions 23d respectively, are molded using molds that open in the axis direction (Y direction), that is an upper mold 129b and a lower mold 129c, as illustrated in FIG. 6.

Tapering generated in the plurality of fins 23c is along the mold opening direction, that is a direction orthogonal to the axis direction (Y direction), hence a uniform ventilation passage can be generated in the cooling flow direction (Y direction), and a drop in the cooling performance by choking in the axial flow can be prevented. Furthermore, the tip areas of the fins on the outermost side are thick, which thickness is greater than the distance between the adjacent fins, therefore an entanglement of fins of the other heat sink can be prevented.

The element support hole 23b molded by the mold that opens in the axis direction (Y direction) is close to the rear face of the fins 23c (connected to the outermost side faces), therefore the outermost area of the fin group 123 having the entanglement preventing portion 23d and the element support hole 23b can be molded using a same pair of upper and lower molds (that is the upper mold 129b and the lower mold 129c), in other words, it is not necessary to provide separate molds only for molding the outermost area.

The molds of the present invention are sufficient if the configuration of the heat sink can be implemented by the opening the molds in the X direction and the opening the molds in the Y direction, and the types of molds and the number of molds to be used are not especially limited. Therefore an area around the mounting hole 23a and an area around the element support hole 23b may be molded using separate molds, and/or the outermost areas of the fin group 123 and the element support hole 23b may be molded using separate molds, as necessary. A plurality of fin groups 123 may be molded together using one mold.

Figure 7:
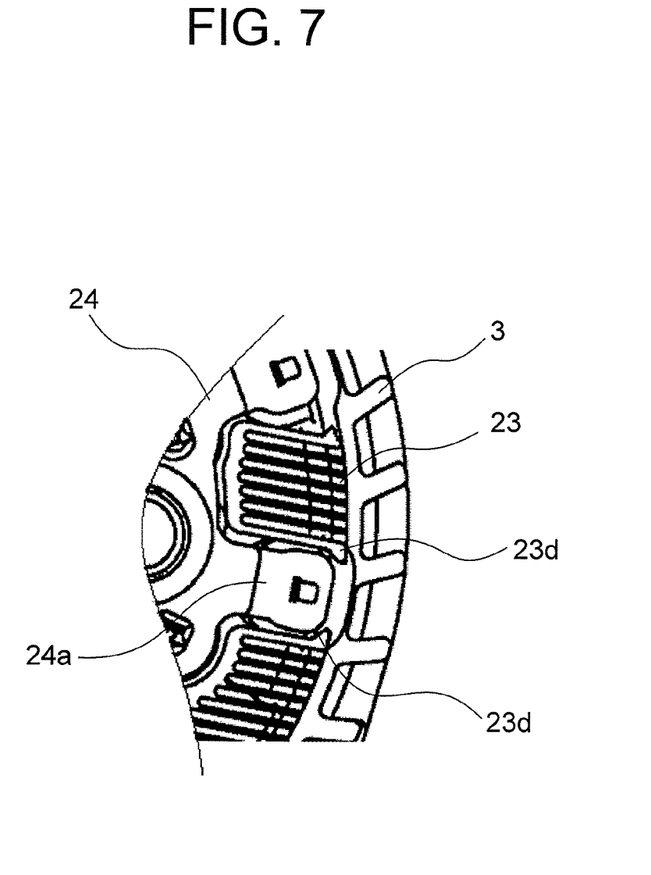
FIG. 7 is a partial enlarged view depicting an area around the entanglement preventing portions in FIG. 2.

The entanglement preventing portions 23d extend to each outermost side face in the fin group 123, and the connection terminal 24a of the circuit board 24 is disposed between the fin groups 123, as illustrated in FIG. 1, FIG. 2 and FIG. 7. The connection terminal 24a extends relatively long, so as to guide the lead wire 14a of the stator winding 14 which is led from the rear bracket 3 to be wired, and easily receives vibration of the vehicle on which the rotary electric machine is installed (see FIG. 1). However according to this embodiment, the entanglement preventing portion 23d closely surrounds the connection terminal 24a from both sides in the circumferential direction, in an area distant from the fixing portion of the circuit board 24, as illustrated in the enlarged view in FIG. 6, and this entanglement preventing portion 23d exhibits a vibration suppressing function. As a result, the effect of improving the reliability of the circuit board 24 can be provided.

Thus according to this embodiment, the entanglement preventing portion is formed on the respective outer surface of the outermost pair of fins out of a fin group, which is a group of a plurality of fins that extends in parallel, hence entanglement between fins can be prevented even though a plurality of fins extending in parallel is used so that the mold opening direction need not be the radiation direction or the axis direction. As a result, deterioration of operability due to entanglement of the fins in the heat sink during assembly can be prevented without a drop in the cooling efficiency of the cooling flow along the rotary shaft.

Although the present invention has been described with reference to the preferred embodiment, it is apparent that numerous modifications and variations can be made by those skilled in the art based on the basic technical concept and teaching of the present invention.

The negative electrode side heat sink supports three elements, and is installed at the left and right of the generator respectively as a pair, but the present invention is not limited to this, and various configurations are possible, such as only one heat sink that supports three elements, or one heat sink that supports six elements, in accordance with required specifications.

EXPLANATION OF REFERENCE NUMERALS 1 vehicle AC generator (rotary electric machine)
4 casing
8 rotor
12 stator
14 stator winding
21 rectifying device
22 positive electrode side heat sink
23 negative electrode side heat sink
23c fin
23d entanglement preventing portion
24 circuit board
123 fin group

The invention claimed is:

1. A rotary electric machine, comprising:
   a rotor that is rotatably supported in a casing;
   a stator that includes a stator winding and is supported in the casing;
   a rectifying device that is disposed on one end side in the axis direction outside the casing, and rectifies an alternate current generated in the stator winding;
   a voltage regulator that is disposed on one end side in the axis direction outside the casing and regulates a level of AC voltage generated in the stator; and
   a connection terminal that guides a lead wire of the stator winding,
   wherein:
      the rectifying device includes a heat sink that supports a rectifying element and has a plurality of fins to cool the rectifying element,
      the plurality of fins are constituted by fin groups in which fins are aligned in parallel in one direction,
      in each of the fin groups, a pair of entanglement preventing portions, each of which is positioned on a respective outer side surface of one of a pair of outermost fins that are located on both sides of a respective fin group, and
      the pair of entanglement preventing portions protrude from and outside of respective outer side faces of the pair of outermost fins and surround the connection terminal from both sides in a circumferential direction.

2. The rotary electric machine according to claim 1, wherein
   the pair of entanglement preventing portions are thick portions integrally formed with the respective outer side faces of the pair of outermost fins.

3. The rotary electric machine according to claim 2, wherein:
   the pair of entanglement preventing portion extend over the connection terminal of a circuit board in a radial direction, and
   the fin groups form a fan-shaped cooling body.

4. A rotary electric machine, comprising:
a rotor that is rotatably supported in a casing;
a stator that includes a stator winding and is supported in the casing;
a rectifying device that is disposed on one end side in the axis direction outside the casing, and rectifies an alternate current generated in the stator winding; and
a voltage regulator that is disposed on one end side in the axis direction outside the casing and regulates a level of AC voltage generated in the stator,
wherein:
the rectifying device includes a heat sink that supports a rectifying element and has a plurality of fins to cool the rectifying element,
the plurality of fins are constituted by fin groups in which fins are aligned in parallel in one direction,
in each of the fin groups, an entanglement preventing portion is disposed only on the respective outer side surfaces of a pair of outermost fins located on both sides of the plurality of fins,
the entanglement preventing portion is a pair of thick portions integrally extended from respective outer side faces of the pair of outermost fins,
a connection terminal of a circuit board disposed among the plurality of fin groups is surrounded by adjacent thick portions such that the adjacent thick portions overlap top portions of the connection terminal in the circumferential direction,
an area between the inner surfaces of the pair of outermost fins in each of the fin groups is formed by a mold which opens in a direction where the fins extend, and
the respective outer surfaces of the pair of outermost fins are formed by a mold which opens in the axis direction.

5. The rotary electric machine according to claim 4, wherein
the respective outer surfaces of the pair of outermost fins are formed by a mold, that is the same as the mold for forming a mounting hole or an element support hole disposed in the heat sink.

6. The rotary electric machine according to claim 4, wherein
the heat sink is a heat sink by die casting.

7. The rotary electric machine according to claim 1, wherein
the thickness of the tip of the fin where a respective one of the pair of entanglement preventing portions is disposed is greater than the distance between adjacent fins.

8. The rotary electric machine according to claim 1, wherein the pair of entanglement preventing portions have thickness increase toward outside near a tip of the corresponding pair of the outermost fins.

9. The rotary electric machine according to claim 1, wherein an area between inner surfaces of the pair of outermost fins in each of the fin groups is formed by a first mold which opens in a direction in which the fins extend and respective outer surfaces of the pair of outermost fins are formed by a second mold which opens in an axis direction.

10. The rotate electric machine according to claim 1, wherein the pair of entanglement preventing portions suppress vibration by surrounding the connection terminal from the circumferential direction in an area distant from a fixing portion of a circuit board and wherein the connection terminal separates each of the fin groups.

* * * * *